United States Patent
Tripathi et al.

(10) Patent No.: US 7,313,139 B2
(45) Date of Patent: Dec. 25, 2007

(54) METHOD FOR BATCH PROCESSING RECEIVED MESSAGE PACKETS

(75) Inventors: Sunay Tripathi, San Jose, CA (US); Sumanth R. Kamatala, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 867 days.

(21) Appl. No.: 10/683,934

(22) Filed: Oct. 10, 2003

(65) Prior Publication Data

US 2005/0125485 A1    Jun. 9, 2005

(51) Int. Cl.
*H04L 12/28* (2006.01)
*H04J 3/16* (2006.01)

(52) U.S. Cl. .................... 370/392; 370/469

(58) Field of Classification Search .............. None
See application file for complete search history.

(56) References Cited

U.S. PATENT DOCUMENTS

| | | | |
|---|---|---|---|
| 6,041,053 A * | 3/2000 | Douceur et al. ............ 370/389 |
| 6,876,668 B1 * | 4/2005 | Chawla et al. .............. 370/468 |
| 6,957,281 B2 * | 10/2005 | Mann et al. ................. 370/389 |
| 7,127,517 B2 * | 10/2006 | Heisig et al. ............... 709/230 |
| 7,194,741 B2 * | 3/2007 | Tayyar et al. ............... 370/232 |
| 2002/0181484 A1 * | 12/2002 | Aimoto ...................... 370/413 |
| 2003/0120795 A1 * | 6/2003 | Reinshmidt ................ 709/232 |
| 2003/0172104 A1 * | 9/2003 | Hooman et al. ............ 709/103 |
| 2004/0090988 A1 * | 5/2004 | Masputra et al. .......... 370/469 |
| 2005/0128951 A1 * | 6/2005 | Chawla et al. ............. 370/235 |
| 2005/0220111 A1 * | 10/2005 | Mann et al. ................. 370/392 |

* cited by examiner

*Primary Examiner*—Andrew C. Lee
(74) *Attorney, Agent, or Firm*—Martine Penilla & Gencarella, LLP (57) ABSTRACT

Embodiments of the present invention are directed to a method for batch processing received message packets. A plurality of message packets are sent in a batch from a network access layer device to a network layer component based upon a blanking NIC interrupt. The network layer component classifies the plurality of message packets and batches them together per transport connection. The network layer component then sends batches for each transport connection to a transport layer component for transport layer processing.

25 Claims, 5 Drawing Sheets

METHOD FOR BATCH PROCESSING RECEIVED MESSAGE PACKETS

RELATED APPLICATIONS

The present patent application claims benefit to U.S. Provisional Patent Application No. 60/465,147 filed Apr. 23, 2003, entitled Vertical Perimeter Protection Mechanism, by Sunay Tripathi, assigned to the assignee of the present invention, and which is hereby incorporated by reference in its entirety herein.

U.S. patent application Ser. No. 10/683,933 entitled "A System And Method For Vertical Perimeter Protection" by Sunay Tripathi and Bruce Curtis, filed on Oct. 10, 2003, assigned to the assignee of the present invention, and which is incorporated by reference in its entirety herein.

U.S. patent application Ser. No. 10/683,897 entitled "A Method and System for Processing Communications Packets According to Event Lists" by Sunay Tripathi and Erik Nordmark, filed on Oct. 10, 2003 assigned to the assignee of the present invention, and which is incorporated by reference in its entirety herein.

U.S. patent application Ser. No. 10/683,720 entitled "Multi Threaded Accept Mechanism in a Vertical Perimeter Communications Environment" by Sunay Tripathi, filed on Oct. 10, 2007 assigned to the assignee of the present invention, and which is incorporated by reference in its entirety herein.

U.S. patent application Ser. No. 10/683,959 entitled "Running a Communication Protocol State Machine Through a Packet Classifier" by Sunay Tripathi and Bruce Curtis, filed on Oct. 10, 2003 assigned to the assignee of the present invention, and which is incorporated by reference in its entirety herein.

U.S. patent application Ser. No. 10/683,762 entitled "A Method and System For Transmitting Packet Chains" by Sunay Tripathi, C Masputra and Bruce Curtis, filed on Oct. 10, 2003 assigned to the assignee of the present invention, and which is incorporated by reference in its entirety herein.

TECHNICAL FIELD

The present invention is related to the field of data communications. More specifically, embodiments of the present invention are directed to a software implemented method for processing message packets.

BACKGROUND

Computer systems typically utilize a layered approach for implementing functionalities relating to communications frameworks where a protocol layer processes different portions of data traveling from a sender to a receiver. A disadvantage to the layered approach is that it requires examination of data by each layer to determine if any work needs to be performed by that layer before sending the data or packet to the next layer. This examination process requires computer instructions and data to be read and processed by the central processing unit(s) (CPU), consuming CPU cycles and therefore time. For many cases, a given layer of processing may not be needed. Thus, a strictly layered approach to a communication framework may be a high cost approach to data processing for communication of individual packets.

SUMMARY

Accordingly, a need exists for a method that reduces the use of available computing resources when processing message packets. While meeting the above stated needs, it is desirable that such a method facilitates processing high priority message packets with minimal delay. Furthermore, while meeting the above stated needs, it is desirable that the cost of implementing such a method is lower than conventional hardware based packet chaining solutions.

Embodiments of the present invention reduce the use of available computing resources when batch processing received message packets. Additionally, high priority message packets can be expedited to minimize processing delays of urgent messages. Embodiments of the present invention do not necessitate the use of expensive intelligent NICs and therefore are less expensive than hardware based packet chaining solutions. In one embodiment, software based packet chaining is described.

In one embodiment, a plurality of message packets are sent from a network access layer device (e.g., a NIC) to a network layer component (e.g., an internet protocol (IP) program module) in a batch instead of one at a time. Since the IP layer has no concept of connection (e.g., it does not perform connection processing of a data packet), the entire chain can be batch processed and classified per connection. Packets for the same connections are batched together and passed to the TCP layer where they are processed with the any previously queued packet for the same connection.

Embodiments or the present invention are advantageous in that because the classifying of the message packets is performed at the network layer, rather than by the NIC, there is no need for intelligent NICs to chain the message packets. Instead, the present invention utilizes the lookup operation performed by the IP program module to determine the connection to which a particular packet belongs.

In one embodiment, the NIC is placed in an interrupt blanking mode wherein it generates an interrupt every "x" milliseconds instead of generating an interrupt as soon as a packet is received. The NIC device driver then chains all of the packets it finds per instance and delivers them to the IP layer in one call instead of processing one packet at a time.

In one embodiment, the packet chain is queued on the synchronization queue (squeue) and each packet is processed with other packets of the same connection. The system benefits because the NIC does not interrupt for every received packet and multiple calls into the IP layer are avoided. Well known NIC hardware can be used without costly extra features.

BRIEF DESCRIPTION OF THE DRAWINGS

The accompanying drawings, which are incorporated in and form a part of this specification, illustrate embodiments of the present invention. Unless specifically noted, the drawings referred to in this description should be understood as not being drawn to scale.

SPECIFICATION

Reference will now be made to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of embodiments of the present invention, numerous specific details are set forth in order to provide a thorough understanding of those embodiments. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "sending," "classifying," "generating," "implementing," "receiving," "assigning," "identifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
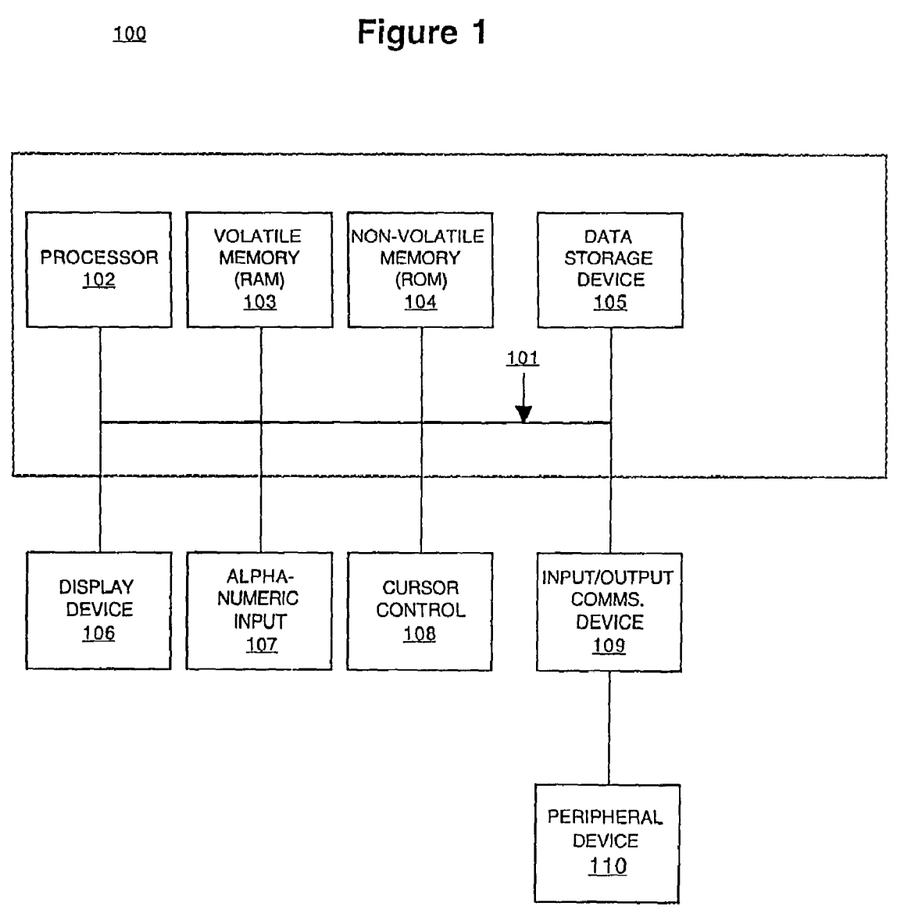
FIG. 1 is a block diagram of an exemplary computer system upon which embodiments of the present invention may be implemented.

With reference to FIG. 1, some embodiments of the present invention are comprised of computer-readable and computer-executable instructions that reside, for example, in computer system 100 which is used as a part of a general purpose computer network (not shown). It is appreciated that computer system 100 of FIG. 1 is exemplary only and that the present invention can operate within a number of different computer systems including a server system, a general-purpose computer system, embedded computer systems, laptop computer systems, hand-held computer systems, and stand-alone computer systems, etc.

In the present embodiment, computer system 100 includes an address/data bus 101 for conveying digital information between the various components, a central processor unit (CPU) 102 for processing the digital information and instructions, a main memory 103 comprised of volatile random access memory (e.g., random access memory (RAM)) for storing the digital information and instructions, and a non-volatile memory 104 (e.g., read only memory (ROM)) for storing information and instructions of a more permanent nature. In addition, computer system 100 may also include a data storage device 105 (e.g., a magnetic, optical, floppy, or tape drive or the like) for storing additional data. It should be noted that in one embodiment the software program for processing message packets of the present invention can be stored either in main memory 103, non-volatile memory 104, data storage device 105, or in an external storage device (not shown).

Devices which are optionally coupled to computer system 100 include a display device 106 for displaying information to a computer user, an alpha-numeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown).

Returning still to FIG. 1, optional display device 106 of FIG. 1 may be a liquid crystal device, cathode ray tube, or other display device suitable for creating graphic images and alpha-numeric characters recognizable to a user. Optional cursor control device 108 allows the computer user to dynamically signal the two dimensional movement of a visible symbol (cursor) on a display screen of display device 106.

Furthermore, computer system 100 can include an input/output (I/O) device 109 (e.g., a interface) for interfacing with a peripheral device 110 (e.g., a computer network, modem, mass storage device, etc.). I/O device 109 may be a network interface card or NIC device. Accordingly, computer system 100 may be coupled in a network, such as a client/server environment, whereby a number of clients (e.g., personal computers, workstations, portable computers, minicomputers, terminals, etc.) are used to run processes for performing desired tasks. In particular, computer system 100 can be coupled in a system for processing message packets.

Figure 2:
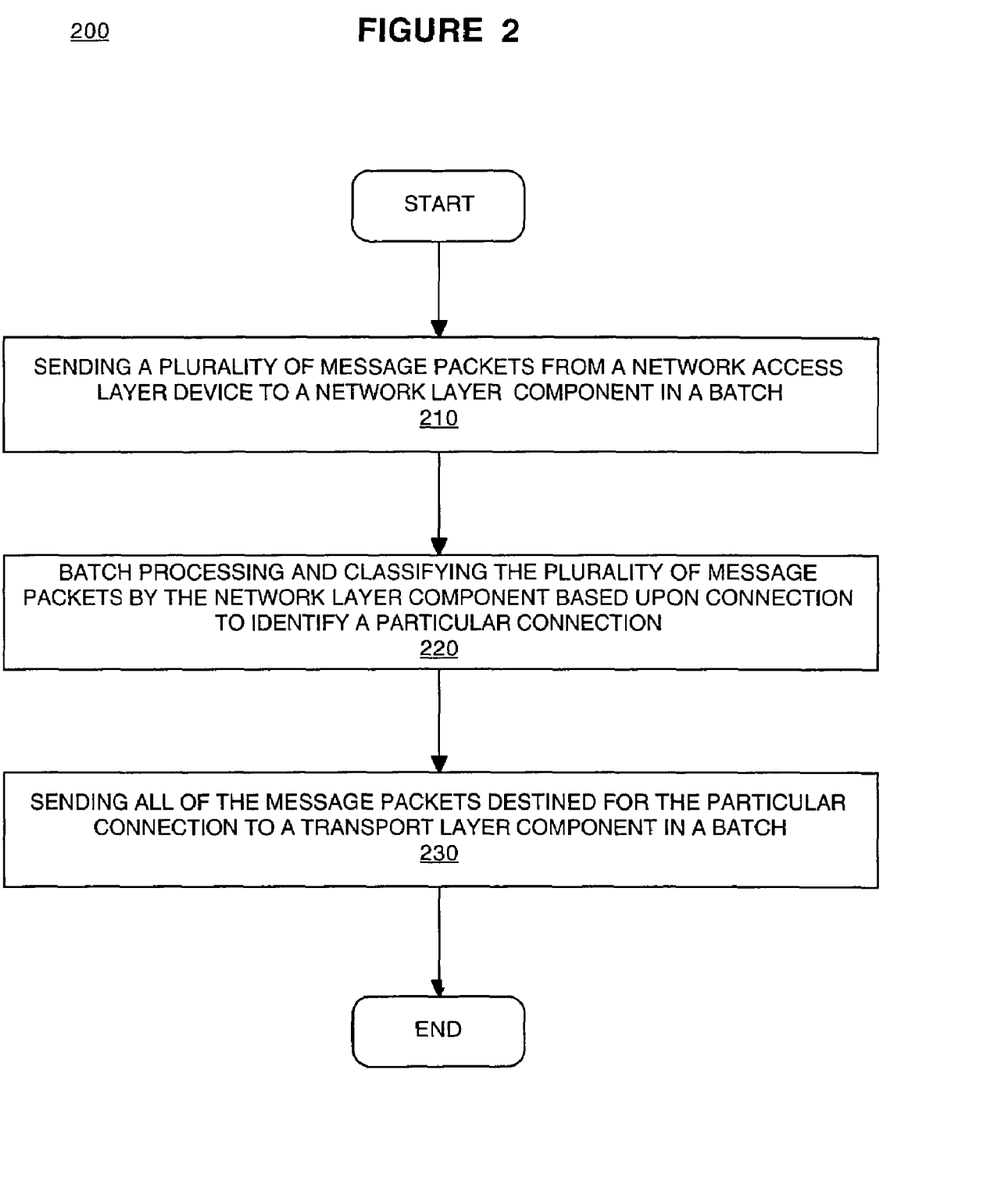
FIG. 2 is a flowchart of a method for processing message packets in accordance with one embodiment of the present invention.
Figure 3:
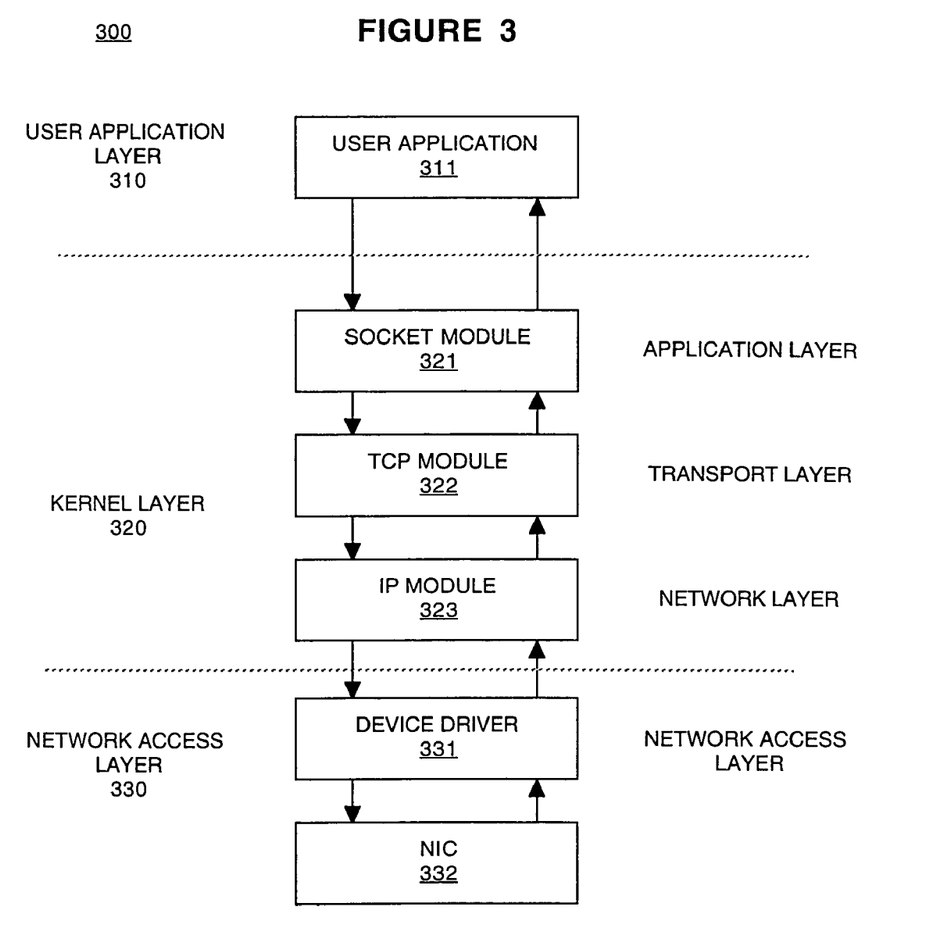
FIG. 3 is a block diagram of communication modules used in accordance with embodiments of the present invention.
Figure 4:
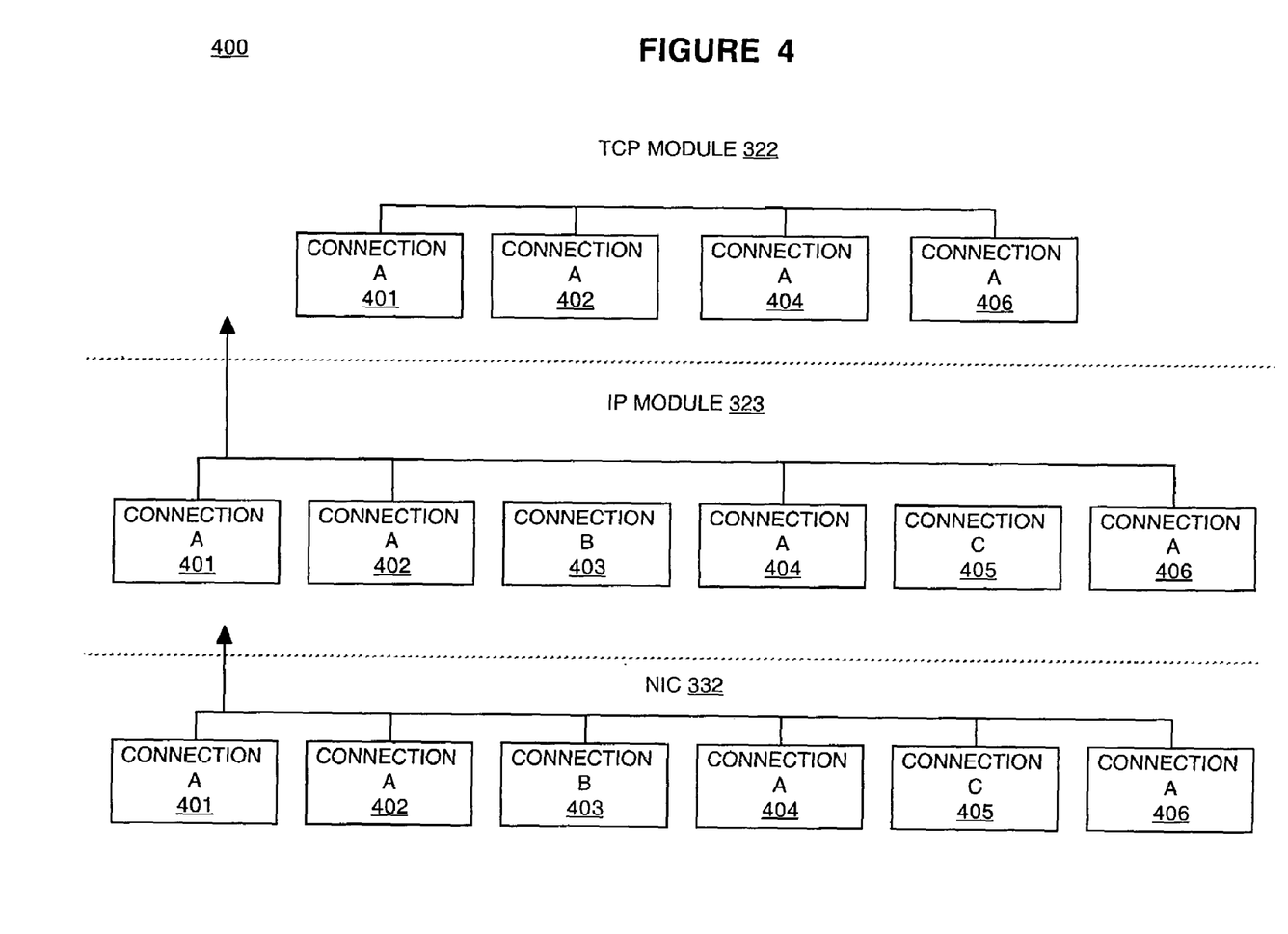
FIG. 4 is a block diagram showing message packets processed in accordance with embodiments of the present invention.

For purposes of clarity, the following discussion will utilize FIGS. 3 and 4 in conjunction with flowchart 200 to clearly describe an embodiment of the present invention. FIG. 2 is a flowchart of a method 200 for processing message packets in accordance with one embodiment of the present invention. FIG. 3 is a block diagram of communication modules used in accordance with embodiments of the present invention. FIG. 4 shows message packets processed in accordance with embodiments of the present invention. In step 210 of FIG. 2, a plurality of message packets are sent from a network access layer device to a network layer component in a batch. Referring now to FIG. 3, a communication connection 300 is comprised of a user application layer 310, a kernel layer 320, and a network access layer 330. In the embodiment of FIG. 3, user application layer 310 comprises a user application 311 which comprise a set of services for providing access to a variety of types of networks.

Kernel layer 320 comprises a variety of modules that perform specific functions when passing message packets upstream (e.g., from network access layer 330 to user application layer 310) and downstream (e.g., from user application layer 310 to network access layer 330). In the embodiment of FIG. 3, kernel layer 320 comprises socket module 321, transfer control protocol (TCP) module 322, and internet protocol (IP) module 323. The modules comprising kernel layer 320 can be mapped to corresponding layers of the TCP/IP suite of protocols. That is, socket module 321 corresponds to the application layer of the TCP/IP protocol. Similarly, TCP module 322 and IP module 323 correspond to the transport and network layers respectively of the TCP/IP suite or protocols. It is appreciated that in embodiments of the present invention, communication connection 300 may utilize other modules and/or communication protocols (e.g., a firewall module) in kernel layer 320.

Network access layer 330 provides physical access to a communications network and corresponds to the network interface layer of the TCP/IP suite of protocols. Network access layer 330 comprises a device driver 331 and a NIC 332.

In one embodiment of the present invention, a blanking interval is implemented upon NIC 332. This is a feature commonly found on most NICs that allows a user to designate a time interval in which message packets are received by NIC 332 without generating an interrupt for each arriving packet. For example, if a user designates a 5 millisecond blanking interval for NIC 332, all of the packets received in that interval are cached by the NIC before being forwarded. In other words, all of the received packets are forwarded without reference to their intended destination. At the end of the blanking interval, a single interrupt is generated by the NIC and the cached packets are sent to IP module 323 via device driver 331 in a single batch. Because interval blanking is a common feature for most NICs, there are no additional NIC related hardware costs associated with implementing embodiments of the present invention. As a result, expensive hardware implemented solutions for chaining message packets are not necessary using embodiments of the present invention.

Referring now to FIG. 4, a plurality of message packets (e.g., message packets 401, 402, 403, 404, 405, and 406 of FIG. 4) are sent from NIC 332 to IP module 323. Message packets 401, 402, 404, and 406 are destined for a first connection "A", while message packets 403 and 405 are destined for connections "B" and "C" respectively. As is shown in FIG. 4, in one embodiment the packets are sent from NIC 332 to a network layer component (e.g., IP module 323) without classifying the packets according to the connection. In the embodiment of FIG. 2, NIC 332 does not perform any classifying or other operation upon the message packets to determine the message connection to which a message packet belongs.

In step 220 of FIG. 2, the plurality of message packets are classified and batch processed by the network layer component (e.g., IP module 323 of FIG. 3) based upon connection to identify a particular connection. In one embodiment, the plurality of message packets received as a result of step 210 are classified by IP module 323.

An example of classifying a communication connection in accordance with embodiments of the present invention is described in U.S. Patent Application No. 60/465,147 filed Apr. 23, 2003, titled Vertical Perimeter Protection System, by Sunay Tripathi, assigned to the assignee of the present invention, and which is hereby incorporated by reference in its entirety herein.

In the above cited reference, a communication connection is identified by the local and remote TCP port number and the local and remote IP address of a message packet. A classifier in the IP module examines the IP header information of each packet and determines the communication connection to which the packet is to be sent. In one embodiment of the present invention, the classifier determines a connection by examining the local IP address, the remote IP address, the local TCP port, and the remote TCP port of the connection. Using this information, the classifier maps each incoming packet to a respective connection.

Referring again to FIG. 2, each of the message packets is classified to determine its destination by the classifier in IP module 323. Referring now to FIG. 4, the classifier in IP module 323 has determined that message packets 401, 402, 404, and 406 are destined for a message connection "A". Similarly, the classifier determines that message packets 403 and 405 are destined for connections "B" and "C" respectively. In accordance with embodiments of the present invention, IP module 323 logically chains message packets 401, 402, 404, and 406 into a single grouping of message packets.

Using IP module 323 for chaining message packets is advantageous because intelligent NIC hardware is not needed in order to send groups of message packets that are associated with a particular connection. Additionally, in one embodiment, sending messages that are time critical, such as interactive applications or emergency notifications, can be forwarded without attempting to create a chain of packets. For example, IP module 323 can examine the IP header of a packet to determine whether it has been flagged as a priority message. If it has been flagged, that packet is forwarded to TCP module 322 without attempting to determine whether another packet is destined for the same connection.

Alternatively, in another embodiment, single packets that have a low priority may be held by IP module 323 until another group of packets is forwarded from NIC 332. In so doing, the possibility of chaining additional message packets that are destined for the same connection is increased. For example, referring again to FIG. 4, message packet 403 can be held by IP module 323 until NIC 332 sends a second group of message packets to the IP module. If any of the message packets are destined for connection "B", they can be chained with message packet 403 and sent to TCP module 322 in a batch.

Embodiments of the present invention is are advantageous because increasing the blanking interval for the NIC can enforce an undesired delay upon message packets that are time critical. Additionally, because the IP module performs its address processing regardless of any processing the NIC may perform, no improvement is realized in processing the packets before sending them to the IP layer.

In embodiments of the present invention, acknowledgement (ACK) messages that acknowledge the receipt of a given sequence of message packets can be chained to reduce the amount of message processing performed. A first message packet may be an ACK message sent to acknowledge the receipt of message packets 2-5 at a remote computer. A second ACK message may acknowledge the receipt of message packets 6-9. Rather than generate 2 interrupts to forward those packets, IP module 323 may generate a single interrupt and combine the packets into a single packet that acknowledges the receipt of message packets 2-9. As a result, a significant reduction in the amount of processing that must be performed upon the message packets is realized in embodiments of the present invention.

In step 230 of FIG. 2, all of the message packets destined for the particular connection are sent to a transport layer component in a batch. In embodiments of the present invention, the batch of message packets classified based upon connection in step 220 are sent to the transport layer in a batch. In other words, all of the packets belonging to a particular connection are sent to TCP module 322 with one pointer. In one embodiment, there are "next" pointers between each of the individual message packets in a chain. Referring again to FIGS. 3 and 4, IP module 323 generates a single interrupt and message packets 401, 402, 404, and 406 are sent from IP module 323 to TCP module 322 in a single batch. In one embodiment, message packets 401, 402, 404, and 406 are sent to a message queue that is associated with message connection "A". Message packets 401, 402, 404, and 406 can then be processed as a group by TCP module 322. This again reduces the amount of processing that is performed upon the message packets. In one embodiment, the queue is an squeue that may be associated with a single processor of a multiprocessor server as described in co-pending patent application entitled A System and Method for Vertical Perimeter Protection, filed Oct. 10, 2003, Ser. No. 10/683,933, by Sunay Tripathi and Bruce Curtis, assigned to the assignee of the present invention and which is hereby incorporated by reference in its entirety herein.

Figure 5:
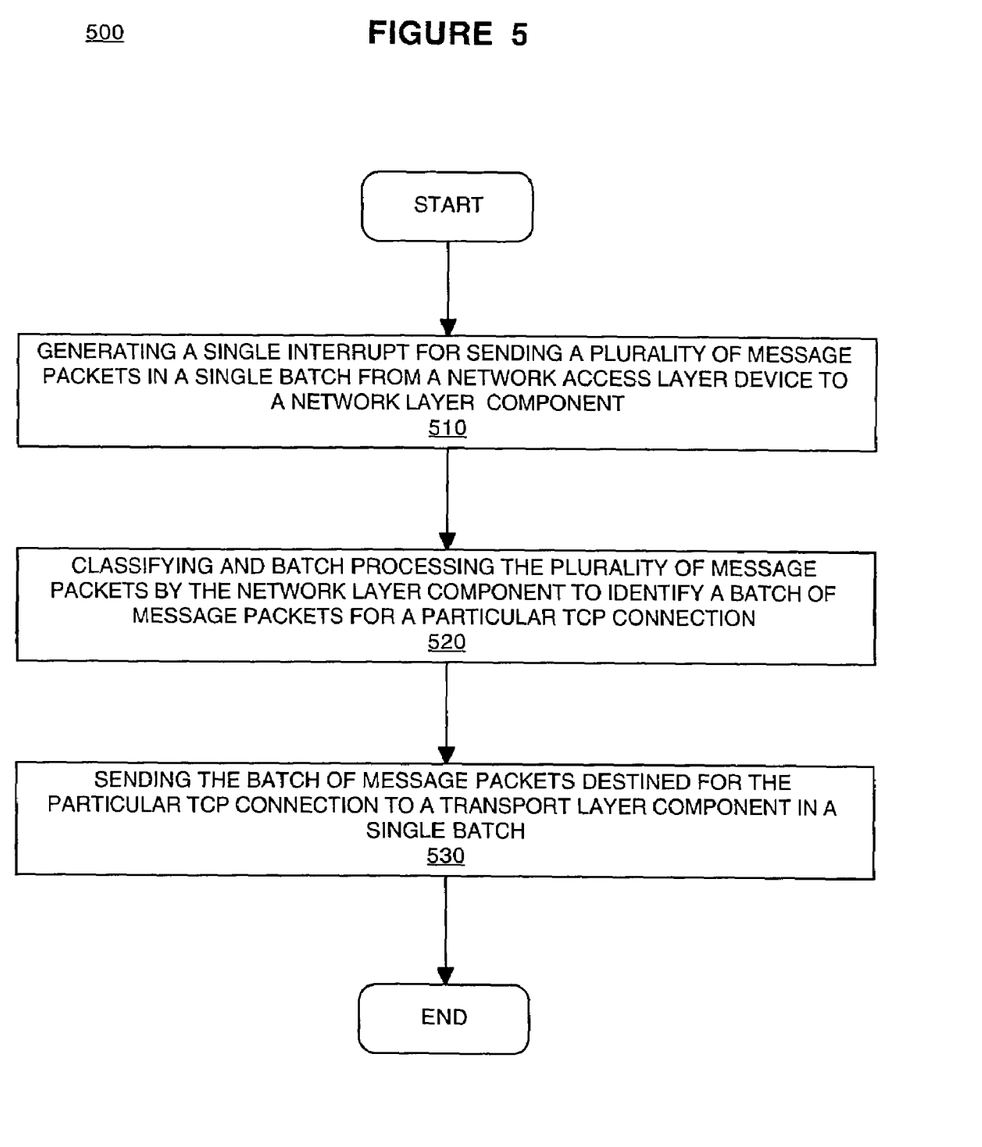
FIG. 5 is a flowchart of a method for exchanging data in accordance with one embodiment of the present invention.

FIG. 5 is a flowchart of a method 500 for exchanging data in accordance with one embodiment of the present invention. In step 510 of FIG. 5, a single interrupt (based upon a predetermined blanking interval) is generated for sending a plurality of message packets in a single batch from a network access layer device to a network layer component. As mentioned above, in embodiments of the present invention, a single interrupt is generated when sending a plurality of packets from the NIC to an IP module. The packets are cached by an internal memory of the NIC upon which a blanking interval has been implemented. In the embodiment of FIG. 5, the network access layer device does not perform any classifying or other operations upon the message packets to determine the message connection to which a message packet belongs. In so doing, embodiments of the present invention allow packet chaining of message packets without the necessity of expensive NIC devices operable to perform this kind of processing.

In step 520 of FIG. 5, the plurality of message packets are classified and batch processed by the network layer component (e.g., IP module 323 of FIG. 3) and a batch of message packets for a particular TCP connection is identified. As described above, a classifier in IP module 323 identifies a message connection based upon local and remote IP address and local and remote TCP port number information in the IP header of the message packets. Because this processing is typically performed by the network layer components already, embodiments of the present invention make redundant the processing performed by intelligent NICs used in conventional packet chaining implementations. In accordance with embodiments of the present invention, IP module 323 logically chains message packets 401, 402, 404, and 406 into a single grouping of message packets based upon the TCP connection of the message packets. In so doing, a batch of message packets for a particular TCP connection is identified.

In step 530 of FIG. 5, the batch of message packets destined for the particular TCP connection are sent to a transport layer component in a single batch. As described above, IP module 323 generates a single interrupt to send a plurality of message packets destined for a given message connection. In embodiments of the present invention, the batch of message packets destined for a particular TCP connection as a batch from the IP layer. This is advantageous because it allows reducing the amount of processing that is performed upon a group of message packets destined for the same message connection.

The preferred embodiment of the present invention, a method for processing message packets, is thus described. While the present invention has been described in particular embodiments, it should be appreciated that the present invention should not be construed as limited by such embodiments, but rather construed according to the following claims.

What is claimed is:

1. A method for processing message packets comprising:
   sending a plurality of message packets from a network access layer device to a network layer component in a batch;
   said network layer component classifying said plurality of message packets based upon connection, wherein packets are batched per transport connection; and
   sending message packets destined for said particular connection in a batch to a transport layer component allocated for said particular connection, wherein said sending a plurality of message packets includes receiving said plurality of message packets in response to a blanking interval of said network access layer device, and generating a single interrupt for sending said plurality of message packets to said network layer component in a single batch.

2. The method as recited in claim 1, wherein said network access layer device does not perform any classifying of said plurality of message packets to identify a message connection.

3. The method as recited in claim 1 wherein said classifying comprises identifying said particular connection based upon header information contained in said plurality of message packets.

4. The method as recited in claim 1, wherein all of said plurality of message packets destined for said particular connection are sent to a connection queue.

5. The method as recited in claim 1 further comprising:
   assigning at least one message packet to a second connection; receiving a second plurality of message packets from said network access layer device in a batch;
   said network layer component classifying said second plurality of message packets wherein an additional message packet is assigned to said second connection; and
   sending a plurality of message packets destined for said second connection to a transport layer component in a batch.

6. The method as recited in claim 5, wherein said at least one message packet is a low priority message packet.

7. The method as recited in claim 1, wherein said network access layer device is a network interface card and said network layer component is an internet protocol (IP) software module.

8. A method for exchanging data comprising:
   generating a single interrupt for sending a plurality of message packets in a single batch from a network access layer device to a network layer component;
   said network layer component classifying and batch processing said plurality of message packets, wherein a batch of message packets for a transport control protocol (TCP) connection is identified; and
   said network layer component sending said batch of message packets destined for said particular TCP connection to a transport layer component in a single batch.

9. The method as recited in claim 8 further comprising:
receiving said plurality of message packets in response to a blanking interval implemented on said network access layer device.

10. The method as recited in claim 8, wherein said classifying comprises identifying said first message connection is based upon internet protocol (IP) header information contained in a first packet.

11. The method as recited in claim 10 further comprising:
assigning at least one message packet to a second connection identified during said classifying; receiving a second plurality of message packets in a batch from said network access layer device;
said network layer component assigning an additional message packet to said second connection in response to packet classification; and sending a plurality of message packets destined for said second connection to a transport layer component in a single batch.

12. The method as recited in claim 8, wherein said network access layer device is a network interface card and said network layer component is an internet protocol (IP) software module.

13. A computer-usable medium having computer-readable program code embodied therein for causing a computer system to perform a method for exchanging data comprising:
sending a plurality of message packets from a network access layer device to a network layer component in a single batch;
said network layer component classifying said plurality of message packets based on connection, wherein a connection is identified; and
sending all of said plurality of message packets destined for said connection in a batch to a transport layer component allocated for said connection.

14. The computer-usable medium of claim 13, wherein said sending comprises:
receiving said plurality of message packets in response to a blanking interval of said network access layer device; and
generating a single interrupt for sending said plurality of message packets to said network layer component.

15. The computer-usable medium of claim 13, wherein said network access layer device does not perform any classifying of said plurality of message packets to identify a connection.

16. The computer-usable medium of claim 13 wherein said classifying comprises identifying said connection based upon header information contained in said plurality of message packets.

17. The computer-usable medium of claim 13, wherein all of said plurality of message packets destined for said connection are sent to a connection queue.

18. The computer-usable medium of claim 13 further comprising:
assigning at least one message packet to a second connection; receiving a second plurality of message packets from said network access layer device in a batch;
said network layer component classifying said second plurality of message packets wherein an additional message packet is assigned to said second connection; and
sending a plurality of message packets destined for said second connection to a transport layer component in a batch.

19. The computer-usable medium of claim 13, wherein said network access layer device is a network interface card and said network layer component is an internet protocol (IP) software module.

20. A computer system comprising:
a bus;
a memory coupled with said bus;
a processor coupled with said bus, said processor for executing a method for performing a method for exchanging data comprising:
sending a plurality of message packets from a network access layer device to a network layer component in a single batch;
said network layer component classifying said plurality of message packets based on connection, wherein a connection is identified; and sending all of said plurality of message packets destined for said connection in a batch to a transport layer component allocated for said connection, wherein said sending includes receiving said plurality of message packets in response to a blanking interval of said network access layer device, and generating a single interrupt for sending said plurality of message packets to said network layer component.

21. The computer system of claim 20 wherein said classifying comprises identifying said connection based upon header information contained in said plurality of message packets.

22. The computer system of claim 20, wherein all of said plurality of message packets destined for said connection are sent to a connection queue.

23. The computer-system medium of claim 20 further comprising:
assigning at least one message packet to a second connection; receiving a second plurality of message packets from said network access layer device in a batch;
said network layer component classifying said second plurality of message packets wherein an additional message packet is assigned to said second connection; and
sending a plurality of message packets destined for said second connection to a transport layer component in a batch.

24. The computer system of claim 20, wherein said network access layer device is a network interface card and said network layer component is an internet protocol (IP) software module.

25. A computer system comprising:
a bus;
a memory coupled with said bus;
a processor coupled with said bus, said processor for executing a method for performing a method for exchanging data comprising:
sending a plurality of message packets from a network access layer device to a network layer component in a single batch;
said network layer component classifying said plurality of message packets based on connection, wherein a connection is identified; and sending all of said plurality of message packets destined for said connection in a batch to a transport layer component allocated for said connection, wherein said network access layer device does not perform any classifying of said plurality of message packets to identify a connection.

* * * * *